April 6, 1926. 1,579,322
W. E. JOHNSON
FLEXIBLE AUTOMATIC TRANSMISSION
Filed Jan. 10, 1920    3 Sheets-Sheet 3
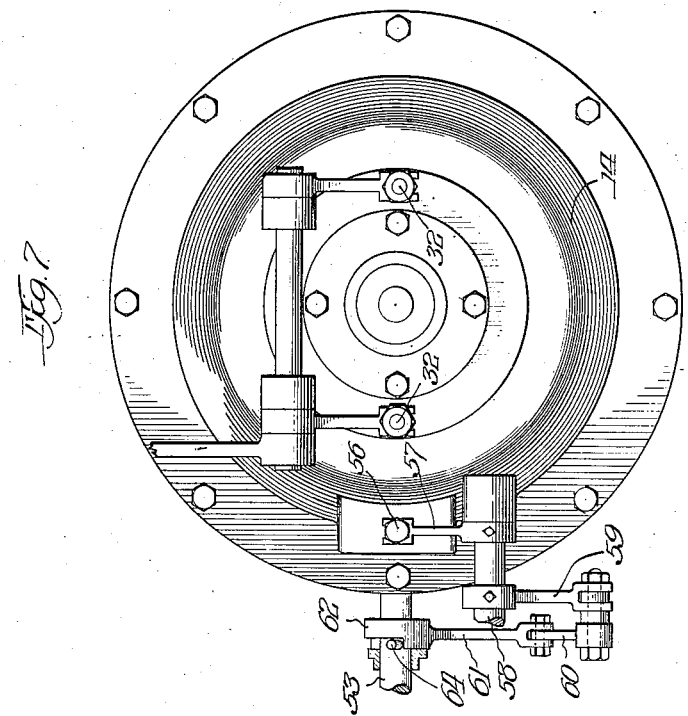
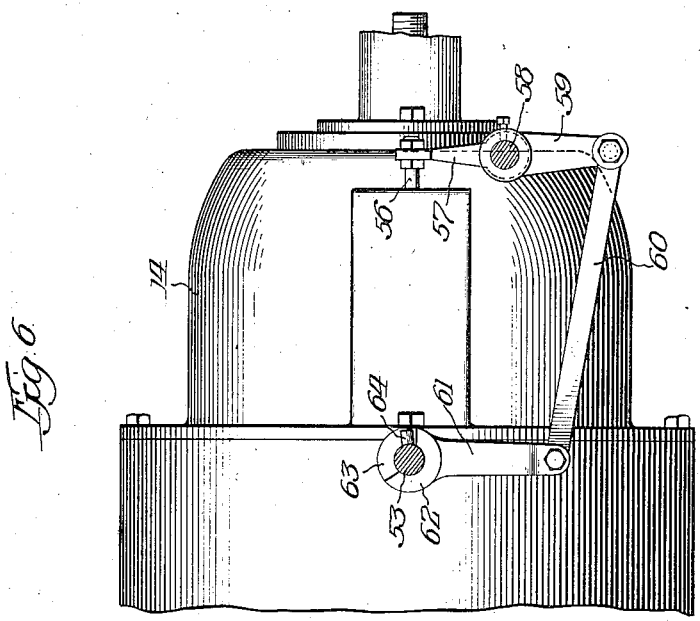
Witness:
Inventor:
William E. Johnson,
By Cromwell, Greist & Warden
Attys.

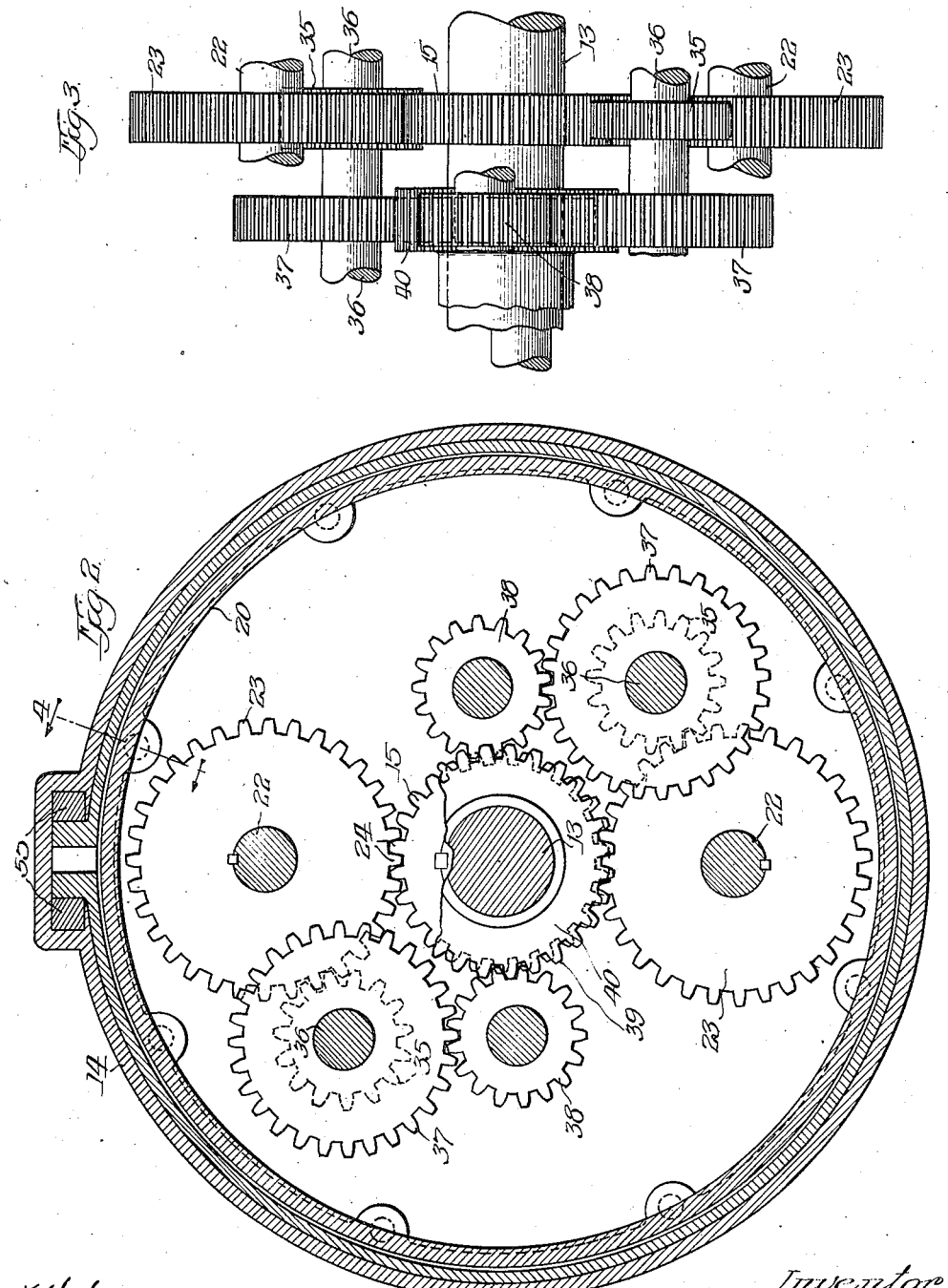

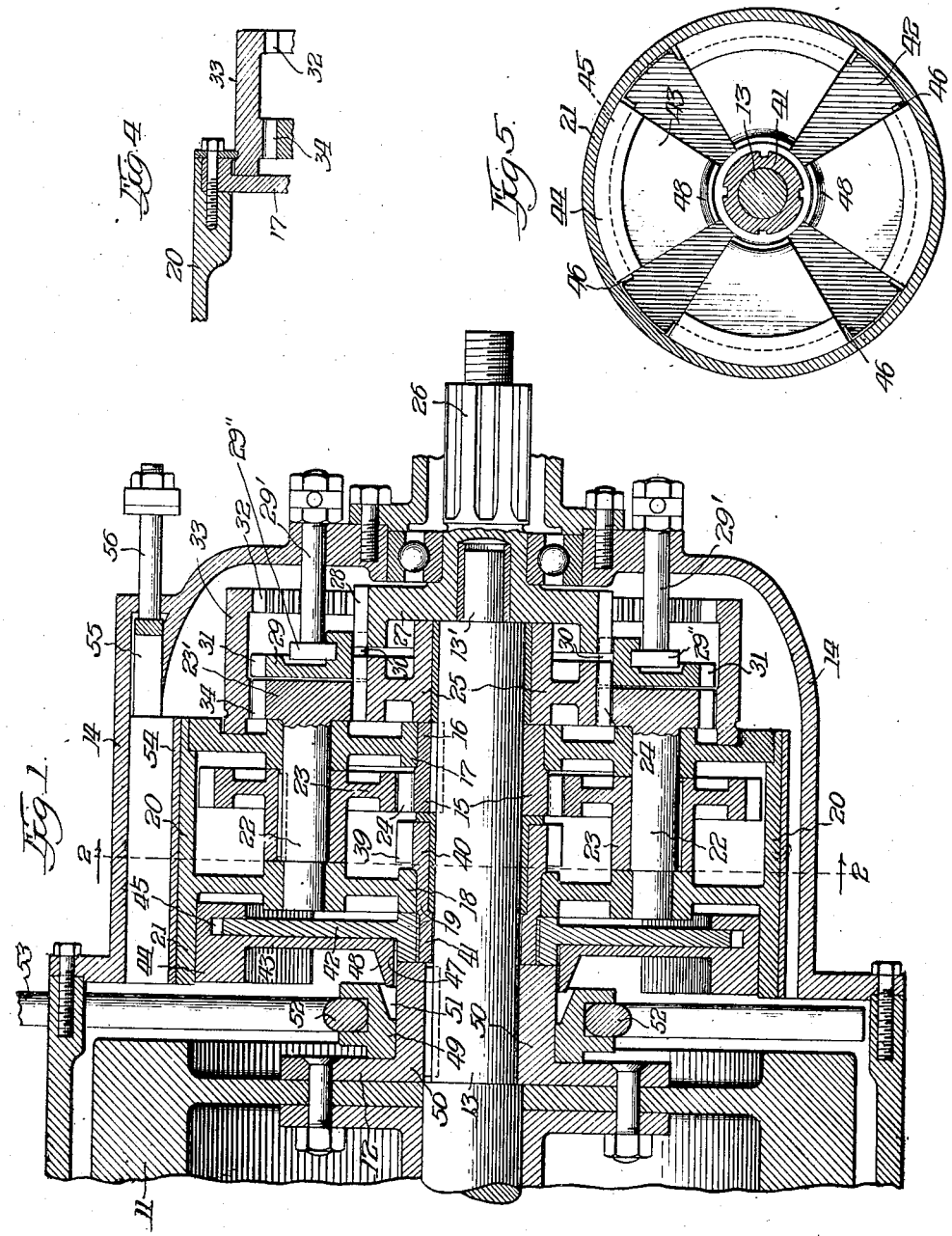

Patented Apr. 6, 1926.

1,579,322

UNITED STATES PATENT OFFICE.

WILLIAM E. JOHNSON, OF KENOSHA, WISCONSIN, ASSIGNOR, BY MESNE ASSIGNMENTS, TO FLEXO DRIVE CORPORATION, OF CHICAGO, ILLINOIS, A CORPORATION OF ILLINOIS.

FLEXIBLE AUTOMATIC TRANSMISSION.

Application filed January 10, 1920. Serial No. 350,599.

*To all whom it may concern:*

Be it known that I, WILLIAM E. JOHNSON, a citizen of the United States, residing at Kenosha, in the county of Kenosha and State of Wisconsin, have invented certain new and useful Improvements in Flexible Automatic Transmissions, of which the following is a specification.

The invention has to do with power transmission, and particularly to the connection between a driving element such as a power shaft having a constant speed and a driven element such as a load shaft, whereby the speed of the latter may be varied from zero to that of the driving element in a gradually rising ratio as distinguished from a step by step ratio.

By the invention also the speed relation between the driving and driven elements is changed automatically by variations in load on the driven element to conform to that of greatest efficiency under the resistance torque conditions existing at the time.

Moreover, under abnormal conditions, as where traction is poor and the resistance of the load at high speed is practically nil, provision is made for manually decreasing the transmission ratio to a point corresponding to the greatest traction efficiency under the then existing conditions.

While the invention is particularly applicable to a motor vehicle and is hereinafter described in that connection, its field of usefulness is not thus limited, but includes power transmission generally, as in machine tools, where it is desirable to translate the substantially constant speed of a main drive into variable speeds at the machine, and manually or automatically to vary the ratio of transmission to maintain the highest efficiency at the point of application.

Provision is made for reversing the direction of drive from that of the power shaft, and maintaining the reverse movement under the same conditions as in the forward drive with reference to automatic change of transmission ratio to conform to change in load. The forward drive, it will be understood, is utilizable independently of the reverse, and in shop installations the reverse would usually be omitted as not needed in the transmission of power from a line shaft to machines driven therefrom.

In order that the invention may be readily understood by those skilled in the art I have, in the accompanying drawings, set forth a preferred embodiment of the same serving as a basis for the following detailed exemplary description. It is apparent that by the disclosure here made various modifications will be suggested to those skilled in the art which come within the scope of the invention as defined by the subjoined claims; wherefore it will be understood that the drawing and description are to be taken in an illustrative and not in an unnecessarily limiting sense.

In the drawings,

Fig. 1 is a horizontal section viewed from below through the gear case and contained gears;

Fig. 2 is a vertical section of the line 2—2 of Fig. 1;

Fig. 3 is a vertical section through Fig. 2;

Fig. 4 is an enlarged fragmentary section through a portion of the mechanism illustrated in Fig. 1, showing the guiding connection between two relatively rotatable parts;

Fig. 5 is a reduced transverse section through the overhanging end portion of the drum illustrated in Fig. 1, showing in face elevation the centrifugally-acting weight members and their disk-like support;

Fig. 6 is a side elevation of the gear case illustrating generally the connection between the emergency and automatic speed control devices; and Fig. 7 is an end view of the gear case.

Having reference in detail to the drawings, and more especially Fig. 1 thereof, the reference numeral 11 designates the fly wheel of the engine constituting the source of power to which by means of a flanged member 12 the drive or power shaft 13 is permanently coupled. The power shaft 13 extends for a considerable distance into the gear case 14 and has keyed thereto a main drive gear 15. Upon a boss 16 of the gear 15 is revolubly mounted a spider 17 which cooperates with a similar spider 18 revolubly mounted upon the boss 19 of another gear to be hereinafter referred to, the spiders forming the end members of a drum 20 having an overhanging end portion 21.

Within the drum at diametrical points are disposed counter shafts 22 journaled in the spiders 17 and 18. Upon each of the counter shafts is mounted a gear 23 in mesh at 24 with the main drive gear 15 of the shaft 13. The counter shafts are enlarged at the end to form gears 23' in mesh at 24' with the teeth of a gear 25 rotatably mounted on the end of the shaft 13.

Axially alined with the drive shaft 13, by means of the reduced end 13' taking into the hollow end thereof, is a driven or load shaft 26 having formed upon its end adjacent the power shaft a gear 27 of the same diameter and lying closely adjacent the gear 25 with its teeth 28 so disposed as to form practically a continuation of the teeth at 24'.

An annular slide gear 29 having internal teeth 30 and external teeth 31, the former broad and the latter narrow, is revolubly and slidably mounted by means of the stem 29' and blocks 29'' so as to be shiftable from the position shown in Fig. 1, with its teeth 30 coupling the teeth 24' of the gear 25 with the teeth 28 of the gear 27, to a position to the right of that shown in said figure wherein its teeth 30 would engage wholly with the teeth 28 and be free of the teeth 24 and with its teeth 31 in mesh with the teeth 32 on the interior of the ring gear 33, which ring gear is mounted to revolve inside the case 14 exterior to the drum 20 and closely adjacent the end spider 17, with its other set of interior teeth 34 in mesh with the teeth upon the gear 23'.

Having reference to Figs. 2 and 3 of the drawings in connection with Fig. 1, it will be observed that the gears 23 upon the counter shaft 22 are each in mesh with a gear 35 upon a shaft 36 carrying also a gear 37, meshing with a smaller gear 38 which in turn is in mesh with the teeth 39 of a gear 40 rotatably mounted upon the shaft 13.

Upon an extension boss 41 of the gear 40 is keyed a disk-like support 42, shown in detail in Fig. 5, for radially movable weight members 43, the enlarged outer edge 44 of each of which lies within and closely adjacent the overhanging portion 21 of the drum 20. The weight members 43 are of segmental shape and the edges 44 are internally grooved as indicated at 45 to receive the peripheral portions of the supporting disk 42 in guiding relation, while the peripheral portions of the disk 42 are provided with arcuate notches the end shoulders 46 of which serve to angularly position the weight members on the disk while providing for free radial movement thereof outwardly into contact with the drum portion 21.

The hub portion of the disk 42 underlies at 47 an oblique faced projection 48 of the segmental weight members 43, the radial distance between the outer surface 47 of the hub portion of the disk 42 and the inner surface of the drum portion 21 is slightly greater than the radial extent of the weight member, leaving a fractional part of an inch within which the weight members may move inwardly and outwardly.

A ring 49 is mounted to rotate and slide loosely upon the hub 50 of the coupling member 12, which ring has a beveled face 51 adapted to engage the beveled face 48 of the weights to press the same inwardly towards the shaft 13 as the ring 49 is moved to the right in Fig. 1, to hold the segmental weights inwardly out of contact with the drum portion 21. The movement of the ring 49 towards and from the weight 43 is accomplished by means of member 52 carried by the shaft or spindle 53, or other suitable eccentric device.

A brake band 54 encircles the drum 20 and its overhanging portion 21, being engaged or disengaged therefrom in the usual manner by means of a clamping yoke 55 having an actuating stem 56 made available for manual operation in any approved manner whereby to control the revolution of the drum 20 about the shaft 13 at will.

It is desirable, as will hereinafter appear, to so couple the automatic control spindle 53 and the emergency control stem 56 that the former may be manually operated independently of the latter but that the operation of the latter shall be accompanied by the former. This may be accomplished in any mechanical way best suited to the convenience of the operator and the design of the particular car or machine in which it is installed.

As one form of connection I have illustrated in Figs. 6 and 7 the emergency control stem 56 as connected by means of an arm 57 to a rock shaft 58 provided with an operative foot pedal or lever, not shown. An arm 59 likewise keyed to the rock shaft 58 is connected by means of a link 60 with an arm 61, a terminal collar 62 of which surrounds the automatic control spindle 53, which spindle is provided with a foot pedal or lever as may be most convenient. The collar 62 has an arcuate slot 63 within which engages a lug 64 on the spindle 53.

It will be apparent that the spindle 53 may be rotated contra clock-wise, as shown in Fig. 6, without affecting the stem 56 or any of the connections; whereas, if the rock shaft 58 be rotated by means of its pedal or lever to move the stem of the emergency control inwardly, the coupling arms 59 and 61 and link 60 will cause the end of the slot 63 to engage the lug 64 and rotate the spindle 53 contra clockwise concurrently with the movement of the stem 56 inwardly to effect an engagement between the band brake 54 and the drum 20.

In describing the operation of my improved transmission it is to be observed at the outset that the power shaft 13 is permanently connected with the source of power and is rotating at the speed of the motor or engine even though the car be standing still. There is no clutch by means of which the driver periodically connects and disconnects the engine with the transmission. When permitted, the transmission itself takes control bringing the load shaft of the car gradually from a position of rest to the speed of the power shaft the speed ratio gradually rising along an unbroken straight line without abrupt variations or step by step changes, avoiding the shifting of gears and unequal strains upon the engine or mechanism as when with ordinary differential transmissions the change is made from a lower to a higher rate of speed.

Assuming the car to be standing still and the engine running, the connection of the main drive gear 15 with the gears 23 on the counter shaft 22 tends to rotate said gears clock-wise as viewed from the left in Fig. 1, but inasmuch as the free rotation of said gears is prevented by the intermeshed relation of the gears 23 with the gear 25 which latter is held stationary by the teeth 30 of the slide gear 29 in engagement with the gear 25 and likewise with the stationary gear 27 of the load shaft 26, the gears 23 cannot rotate upon their shafts but must roll around the gear 15, wherefore the rotary motion of the gear 15 in a clockwise direction is translated into a revolving motion of the gears 23 and counter shafts 22 the spiders 17 and 18 and the drum 20 about the shaft 13 as an axis in a contra clockwise direction.

With the car at rest, the control ring 49 overlies with its beveled face 51 the beveled face 48 of the weight members 43, holding the heads 44 of the latter out of contact with the drum 21. There being nothing to resist the revoluble movement of the gears within the drum about the power shaft as an axis and consequently no energy is transmitted to the load shaft through its gear 27 acting to move the latter.

During this condition of affairs, the revolution of the drum and its contained gears about the shaft is in a direction contrary to that of the rotation of the shaft itself, and the gearing interposed between the main drive gear 15 and the gear 40 causes the latter to rotate in the same direction as the shaft and at a greater speed, wherefore the weight members 43 and 44 are rapidly revolving within the drum 21 and in a direction opposite thereto.

If now the driver by means of his pedal or lever rotates the spindle 53 in a contra clockwise direction, as viewed in Fig. 6, he shifts the control ring 49 out of overlying engagement with the beveled projection 48 of the weight members, and the latter will under centrifugal action fly outward into frictional engagement with the drum portion 21 thus by a braking action slowing up the movement of the drum in a direction contrary to that of the weights.

The resistance thus applied to the contra clock-wise movement of the drum 20 reacts to translate the revolving motion of the gears 23 into a rotary movement whereby impelling force is applied to the load gears at 27 in gradually augmenting degree to compensate for the slowing up of the revolving motion of the gears about the power shaft 13. As the drum 20 is gradually slowed the speed of the gear 27 and the load shaft 26 is gradually accelerated.

Thus the contra clock-wise movement of the drum 20 is gradually reduced to a stage wherein it is at rest with reference to the gear case and the band brake 54, but this is a transition stage merely and has no measurable duration, the gradual acceleration of the rotation of the drum proceeding without any interruption from a contra clock-wise movement through a stationary instant to a clock-wise movement relative to the brake band.

At the instant the contra clock-wise movement of the drum within the casing ceases and its clock-wise direction begins the counter shafts are stationary within the casing and the ratio of transmission between the power shaft 13 and the load shaft 26 is at the low ratio fixed by the relative sizes of the gears 15, 23, 23' and 27, and might be said to roughly conform to "first" or "low" of the ordinary differential transmission.

Continuously, without interruption, the drum is picking up a speed of rotation in a clock-wise direction approximating more and more closely that of the revolving weight members by which it is urged forward.

During all of this time, it will be understood that as the rotation of the gears 15 is gradually translated from a revolving movement of the gears within the drum into a rotary movement transmitted to the load shaft, the revoluble movement of the weight members 43 is being slowed up until it corresponds with that of the power shaft 13. When this takes place, the clock-wise movement of the drum 20 will have attained the same speed as the impelling weight members, and the drum and its content of gears will be moving about the axis of the power shaft 13 at the speed of said shaft, the load shaft 26 and its gear 27 will be rotating at precisely the speed of the power shaft 13, or in a one-to-one ratio, while the slide gear 29 and ring gear 33 will be partaking of the motion of the drum and of the power and load shafts, with the car moving in a forward direction.

If there occurs an increase of load or resistance torque as where the car reaches an incline such as a hill at high speed, the increased resistance is transmitted backward through the load gear at 27 and tends to slow up the rotary movement of the gears 23 and 23' of the counter shafts, again translating this rotary movement of the gears to a greater or less exent dependent upon the increased resistance torque into a renewal of the revolving movement of the counter shaft and gears with the drum about the power shaft, in other words a lag of the drum and gears relative to the shaft 13, which acting reversely of that previously described reduces the ratio of transmission between the power shaft and the load shaft to such a degree as will correspond to the most efficient application of power from the power shaft to the load under the conditions then existing.

Thus automatically there will be a shifting along a gradually declining straight line from a higher speed ratio to a lower speed ratio, having its limit in zero if the load exceeds the capacity of the engine. In that event, however, the engine will not be stalled but the car will stop. At any stage short of a load in excess of the power of the engine, the speed ratio will be decreased only to such extent as is consonant with the greatest efficiency of the engine under the new load conditions.

If we assume abnormal conditions as where by reason of ice or mud traction is very poor, and the transmission be left wholly to the automatic control of the weight members 43, 44 cooperating with the drum 20 there would be a slippage of the car wheels at high speed, by reason of lack of resistance to reduce the speed ratio. In such circumstances, the driver will operate his emergency brake pedal or lever to bring the band brake 54 into engagement with the drum and thereby automatically, as previously described, shift the control ring 49 inwardly to remove the brake members from operation. This will slow down the revolution of the drum 20 bringing it to a stop, under which conditions, as previously described, there is a direct positive transmission of power from the shaft 13 to the shaft 26 at that low speed ratio which will most efficiently promote traction of the wheels upon the slippery surface. By gradually releasing the pressure of the brake band upon the drum as the wheels take hold, the speed ratio will increase, and after the emergency has passed the brake band 54 will be released and the control ring 49 removed from engagement with the weight elements whereby they may again take control.

In order to reverse the direction of movement of the car, the same is brought to a stop by throwing in the control ring 49 whereby the control weights 44 are brought out of contact with the drum portion 21. This leaves the drum free to revolve due to the reaction or resistance of the load gear 27 to the rotary movement of the gear 23', resulting in a slowing up of the revolving motion of the drum in a clock-wise direction and its ultimate transformation into a contra clock-wise revolution.

With the car stationary, the driver by means of the stems 29' shifts the gear teeth 30 of the slide gear 29 wholly onto the gear 27, uncoupling the latter from the gear 25 and leaving the gear 25 free to spin idly on the shaft 13. In this neutral position, it is evident that the ring gear 33 is moving in a contra clock-wise direction with the drum. As the slide gear 29 is moved farther to the right, bringing its teeth 31 into mesh with the teeth 32 of the ring gear 33, it thus makes a direct bridge-coupling between the ring gear 33 and the load gear 27. The resistance of the stationary gear 27 transmitted through the slide gear 29, to the ring gear 33 and thence to the gear 23', slows up the rotation of the latter, translating its energy into a clock-wise revolution of the drum which is entirely free to move.

The conditions now are the same as those described at the outset with the car at rest except that it is now in condition for reverse movement instead of for forward movement as previously assumed. However, the drum 20 is revolving in a clock-wise direction as distinguished from a contra clock-wise direction under the former assumption. The emergency brake 54 is then applied to the drum 20 slowing up its speed of revolution and causing its revoluble movement to be translated gradually into a reverse movement of the load gear 27 and shaft 26 until, when the drum 20 is brought to a state of rest by the brake 44, power is transmitted from the shaft 13 to the shaft 26 by way of the gears 15, 23, 23', 33, 29 and 27.

It will be observed that in the reverse, as distinguished from the forward drive, the effective diameter of the load gear 27 is increased by the bridging action of the slide ring 29 to the inner diameter of the ring gear 33, whereby it follows that the established ratio of speed transmission is much lower than in the case of the forward drive under the same stationary condition of the drum.

It will be clear that the same automatic and manual control takes place in the same way when torque resistance conditions change in rearward travel as in a forward direction.

I claim:

1. In a power transmission, a power shaft connected to the power source, a gear thereon, a drum rotatable on the shaft about the gear, a counter-shaft carried by the drum and revoluble about the power shaft, a gear on the counter-shaft in mesh with that on the power shaft, a second gear on the counter-shaft, a load shaft, and a gear rotatable with said load shaft and in mesh with the last named gear, in combination with braking means acting directly on the drum and in sliding contact therewith to control the revolution of the same whereby to vary gradually the speed ratio between the power and load shafts from zero to maximum.

2. In a power transmission, a power shaft connected to the power source, a gear thereon, a load shaft, a gear thereon, and a train of gears positively connecting the gears on the power and load shafts, said train including a counter-shaft and pinions revoluble about the axis of the power shaft, in combination with centrifugally operating braking means to control automatically the speed of revolution of the counter-shaft and pinions whereby to vary gradually the ratio of speed transmission between zero and maximum, said braking means being manually made operable.

3. In a power transmission, a power transmitting element connected to the power source, a gear thereon, a load shaft, a gear thereon, and a train of gears positively connecting the gears on the power transmitting element and the load shaft, said train including a counter-shaft and pinions revoluble about the axis of the power transmitting element, a drum associated with the counter-shaft and pinions concentrically of the power-transmitting element and revolving therewith, in combination with centrifugally operating weight members acting upon the drum and in sliding contact therewith to control the speed of revolution of the counter-shaft and pinions whereby to vary gradually and automatically the ratio of speed transmission.

4. In a power transmission, a power shaft connected to the power source, a gear thereon, a load shaft, a gear thereon, and a train of gears positively connecting the gears on the power and load shafts, said train including a counter-shaft and pinions revoluble about the axis of the power shaft, a drum enclosing the counter-shaft and pinions and revolving therewith, in combination with manually controlled braking means acting upon the exterior of the drum, and automatic braking means acting upon the interior of the drum to control the speed of revolution of the counter-shaft and pinions whereby to vary gradually the ratio of speed transmission between zero and maximum, the automatic braking means controlled by the resistance torque to vary the speed ratio automatically to correspond with the load.

5. In a power transmission, a power shaft connected to the power source, a gear thereon, a load shaft, a gear thereon, and a train of gears positively connecting the gears on the power and load shafts, said train including a counter-shaft and pinions revoluble about the axis of the power shaft, a drum enclosing the counter-shaft and pinions and revolving therewith, in combination with braking means acting upon the drum to control the speed of revolution of the counter-shaft and pinions whereby to vary gradually the ratio of speed transmission between zero and maximum, said braking means comprising a gear driven from the said train and rotatably mounted on the power shaft, weights revolving with said gear and arranged to engage centrifugally the inner surface of the drum, and manually controlled means to restrain the weights at will.

6. In a power transmission, a power shaft connected to the power source, a gear thereon, a load shaft, a gear thereon, and a train of gears positively connecting the gears on the power and load shafts certain gears of the train shiftable to reverse the direction of drive at will, said train including a counter-shaft and pinions revoluble about the axis of the power shaft, in combination with braking means to control the speed of revolution of the counter-shaft and pinions whereby to vary gradually the ratio of speed transmissions between zero and maximum.

7. In a power transmission, a power shaft connected to the power source, a gear thereon, a drum rotatable on the shaft about the gear, a counter-shaft carried by the drum and revoluble about the power shaft, a gear on the counter-shaft in mesh with that on the power-shaft, a second gear on the counter-shaft, a load shaft, a load gear thereon, an idler gear in juxtaposition to said load gear and in mesh with said second gear on the counter-shaft, an idler ring gear having two spaced series of internal teeth, the second gear on the counter-shaft in mesh on one side with the first series of idler ring teeth and on the other side with said idler gear, means for alternatively connecting said load gear with the idler gear or with the idler ring whereby the load shaft may be driven respectively in forward or reverse directions, and braking means to control the revolution of the drum whereby to vary gradually the speed ratio between the power and load shafts.

8. In a power transmission, a power shaft connected to the power source, a gear thereon, a drum rotatable on the shaft about the gear, a counter-shaft carried by the drum and revoluble about the power shaft, a gear on the counter-shaft in mesh with that on the power-shaft, a second gear on the counter-shaft, a load shaft, a load gear thereon, an idler gear in juxtaposition to said load gear and in mesh with said second gear on the counter-shaft, an idler ring having two spaced series of internal teeth, the second gear on the counter-shaft in mesh on one side with the first series of idler ring teeth and on the other side with said idler gear, means for alternatively connecting said load gear with the idler gear or with the idler ring whereby the load shaft may be driven respectively in forward or reverse directions, and braking means to control the revolution of the drum whereby to vary gradually the speed ratio between the power and load shafts from zero to maximum in both forward and reverse drive.

9. In a power transmission, a power shaft connected to the power source, a gear thereon, a drum rotatable on the shaft about the gear, a counter-shaft carried by the drum and revoluble about the power shaft, a gear on the counter-shaft in mesh with that on the power-shaft, a second gear on the counter-shaft, a load shaft, a load gear thereon, an idler gear in juxtaposition to said load gear and in mesh with said second gear on the counter-shaft, an idler ring having two spaced series of internal teeth, the second gear on the counter-shaft in mesh on one side with the first series of idler ring teeth and on the other side with said idler gear, a reverse sliding ring having internally broad teeth and externally narrow teeth, said ring being slidable whereby either to bring its broad teeth into mesh with both the idler gear and load gear for driving in one direction or its narrow teeth into mesh with the load gear and second set of teeth on the idler ring for driving in the reverse direction, and braking means to control the revolution of the drum whereby to vary gradually the speed ratio between the power and load shafts from zero to maximum in both forward and reverse drive.

10. In a power transmission, the combination of a driving element, a load-carrying driven element aligned therewith, means including a train of gears connecting said elements whereby to drive the latter by the former, means acting centrifugally on said connecting means whereby to vary gradually the ratio of speed transmission from zero to maximum, and means acting on said last-mentioned means to make inoperative said connecting means.

11. In a power transmission, the combination of a driving element, a load-carrying driven element aligned therewith, means connecting said elements whereby to drive the latter by the former, and means acting thereon whereby to vary gradually the ratio of speed transmission from zero to maximum, said last mentioned means rotating with the driving element at a relatively variable speed always equal to or greater than that of the same.

12. In a power transmission, a power shaft connected to the power source, a gear thereon, a load shaft, a gear thereon, and a train of gears positively connecting the gears on the power and load shafts, said train including a counter-shaft and pinions revoluble about the axis of the power shaft, in combination with braking means to control the speed of revolution of the counter-shaft and pinions whereby to vary gradually the ratio of speed transmission between zero and maximum, said means being automatically controlled by the resistance torque to vary the speed ratio to correspond with the load, and means for driving said load shaft in a forward or reverse direction relative to the rotation of the power shaft.

13. In a power transmission, the combination of a driving element, a load-carrying driven element alined therewith, power transmitting means including a train of gears in connection with said driving element with one of the gears secured concentrically to the driving element, power transmitting means in connection with said driven element, and means carried by one of said means and bearing with centrifugal force frictionally on the other whereby to vary gradually the ratio of speed transmission.

14. In a power transmission, the combination of a driving element, a load-carrying driven element aligned therewith, and means connecting said elements whereby to drive the latter by the former, said connecting means including a train of gears in which one gear is secured concentrically to one of said elements and radially reciprocable weight members adapted to bear centrifugally on other portions of said connecting means whereby to vary gradually the ratio of speed transmission.

15. In a power transmission, the combination of a driving element, a load-carrying driven element aligned therewith, power transmitting means in connection with said driving element, power transmitting means including a train of gears in connection with said driven element one gear of the train being secured concentrically to the driven element, and means carried by one of said means and bearing through centrifugal force on the other whereby to vary gradually and automatically the ratio of speed transmission.

16. In a power transmission, the combination of a driving element, a load-carrying driven element aligned therewith, power transmitting means in connection with said driving element, power transmitting means including a train of gears in connection with said driven element, and radially reciprocable weight members carried by one of said means and bearing centrifugally on the other whereby to vary gradually the ratio of speed transmission from zero to maximum.

17. In a power transmission, the combination of a driving element, a load-carrying driven element aligned therewith, power transmitting means in connection with said driving element, power transmitting means in connection with said driven element, and radially reciprocable weight members carried by one of said means and bearing centrifugally on the other whereby to vary gradually the ratio of speed transmission from zero to maximum, the centrifugal force exerted by said weight members increasing with a decrease in the speed of the driven shaft relative to that of the driving shaft.

18. In a power transmission, the combination of a driving element, a load-carrying driven element aligned therewith, and means connecting said elements whereby to drive the latter by the former, said means including a train of gears in which one gear is secured concentrically to one of said elements and centrifugally operating means bearing frictionally on other portions of said connecting means whereby to vary gradually the ratio of speed transmission.

19. In a power transmission, the combination of a driving element, a load-carrying driven element, gears positively connecting said elements with one of the gears connected to rotate with and arranged concentrically of one of said elements whereby to drive the driven element by the driving element, a drum arranged concentrically of the transmission axis and connected with the gearing, and centrifugally operating means bearing automatically thereon whereby to vary gradually the ratio of speed transmission to correspond to the load resistance.

20. In a power transmission, a power shaft connected to a power source, a gear thereon, a counter-shaft parallel to and revoluble in both directions about the power shaft, a gear on the counter-shaft in mesh with that on the power shaft, a second gear on the counter-shaft, a load shaft, and a gear rotatable with said load shaft and in mesh with the last named gear, in combination with centrifugally operating braking means to control the speed of revolution of the counter-shaft whereby to vary gradually and automatically the speed ratio between the power and load shafts from zero to maximum.

21. In a power transmission, a power shaft permanently connected to the power source, a gear thereon, a counter-shaft parallel to and revoluble in both directions about the power shaft, a gear on the counter-shaft in mesh with that on the power shaft, a second gear on the counter-shaft, a load shaft, and a gear rotatable with said load shaft and in mesh with the last named gear, in combination with centrifugally operating braking means to control the speed of revolution of the counter-shaft whereby to vary gradually and automatically the speed ratio between the power and load shafts from zero to maximum.

22. In a power transmission, a power shaft connected to the power source, a gear thereon, a load shaft, a gear thereon, and a train of gears positively connecting the gears on the power and load shafts, said train including a counter-shaft and pinions revoluble in both directions about the axis of the power shaft with the axis of the counter-shaft parallel to that of the power shaft, in combination with centrifugally operating braking means to control automatically the speed of revolution of the counter-shaft and pinions whereby to vary gradually the ratio of speed transmission between zero and maximum.

23. In a power transmission, a power shaft connected to the power source, a gear thereon, a load shaft, a gear thereon, and a train of gears positively connecting the gears on the power and load shafts, said train including a counter-shaft and pinions revoluble in both directions about the axis of the power shaft with the axis of the counter-shaft parallel to that of the power shaft, in combination with centrifugally operating braking means to control the speed of revolution of the counter-shaft and pinions whereby to vary gradually the ratio of speed transmission between zero and maximum, said means being automatically controlled by the resistance torque to vary the speed ratio to correspond with the load.

24. In a vehicle transmission a driving element adapted for connection with a motor, a driven element adapted for connection with a variable load resistance oftentimes in excess of the power efficiently available from the motor, and connecting means between the driving element and the driven element for effecting therebetween either a one-to-one drive or a reduced drive under a multiplication of torque, said connecting means comprising a drum connected to one of said elements, a plurality of centrifugally operating weight members connected to the other of said elements for static frictional engagement with the drum when the load resistance is equal to or less than the power efficiently available and for kinetic frictional engagement with the drum when the load resistance is in excess of the power efficiently available, and planetary reduction gearing having one of the gears connected for rotation with and arranged concentrically of one of said elements, said gearing being so connected as to be inoperative to effect a reduction when the weight members are in static frictional engagement with the drum and operative to effect a reduction and produce a multiplication of torque through the transmission when the weight members are in kinetic frictional engagement with the drum.

25. In an automatic transmission for vehicles, a driving element, a driven element in axial alignment therewith, and means connecting the said elements to effect automatically therebetween either a reduced or a one-to-one drive, said connecting means including a gear arranged concentrically of the transmission axis for rotation with the driving element, another gear also arranged concentrically of the transmission on axis for rotation with the driven element, planet gears meshed with said gears and revolvable about the transmission axis, a drum arranged concentrically of the transmission axis for rotation about the same with one of the three above described portions of the said connecting means, and a plurality of weight members revolvable about the transmission axis and movable outwardly therefrom under centrifugal force into frictional engagement with the drum upon rotation of one of the said elements.

In testimony whereof I have hereunto subscribed my name.

WILLIAM E. JOHNSON.